United States Patent
Henze et al.

(10) Patent No.: US 12,086,462 B2
(45) Date of Patent: Sep. 10, 2024

(54) PRE-SUSPEND BEFORE PROGRAM IN A NON-VOLATILE MEMORY (NVM)

(71) Applicant: Seagate Technology LLC, Fremont, CA (US)

(72) Inventors: Jonathan M. Henze, Savage, MN (US); Ryan J. Goss, Prior Lake, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/381,342

(22) Filed: Jul. 21, 2021

(65) Prior Publication Data
US 2022/0035566 A1 Feb. 3, 2022

Related U.S. Application Data

(60) Provisional application No. 62/706,057, filed on Jul. 29, 2020.

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0676* (2013.01); *G06F 3/0679* (2013.01); *G06F 12/0253* (2013.01)

(58) Field of Classification Search
CPC .... G06F 3/0659; G06F 3/0604; G06F 3/0679; G06F 3/0676; G06F 12/0253; G06F 12/0862
See application file for complete search history.

(56) References Cited

U.S. PATENT DOCUMENTS

| | | | |
|---|---|---|---|
| 7,484,037 B2 | 1/2009 | Krantz et al. | |
| 7,978,516 B2 | 7/2011 | Olbrich et al. | |
| 8,228,701 B2 | 7/2012 | Sokolov et al. | |
| 8,918,595 B2 | 12/2014 | Ebsen | |
| 9,645,177 B2 | 5/2017 | Cohen et al. | |
| 9,754,682 B2 | 9/2017 | Mateescu et al. | |
| 2014/0075102 A1* | 3/2014 | Oh | G06F 12/0246 711/103 |
| 2016/0054997 A1* | 2/2016 | Radhakrishnan | G06F 12/0862 711/137 |
| 2017/0160931 A1* | 6/2017 | Thakkar | G06F 3/0688 |
| 2019/0163651 A1* | 5/2019 | Kowles | G06F 3/061 |
| 2019/0278710 A1* | 9/2019 | Ehrlich | G06F 3/0676 |
| 2020/0034061 A1 | 1/2020 | Khalili et al. | |

* cited by examiner

*Primary Examiner* — Baboucarr Faal
(74) *Attorney, Agent, or Firm* — Hall Estill Law Firm (57) ABSTRACT

Method and apparatus for managing data in a storage device, such as a solid-state drive (SSD). An apparatus includes a main non-volatile memory (NVM) such as a NAND flash memory. A host command queue lists pending data transfer commands to transfer data between the NVM and a host. For each write command received by the NVM to store write data to an associated target location, a controller examines the host command queue. Based on this review, the controller may direct the NVM to read data adjacent the associated target location to which data are to be written by the write command and to transfer the read data to a read cache. The read data may use some or all of the same resources used to store the write data to the NVM. The read data may be subsequently transferred from the read cache to the host.

20 Claims, 4 Drawing Sheets

PRE-SUSPEND BEFORE PROGRAM IN A NON-VOLATILE MEMORY (NVM)

RELATED APPLICATION

The present application makes a claim of domestic priority to U.S. Provisional Patent Application No. 62/706,057 filed Jul. 29, 2020, the contents of which are hereby incorporated by reference.

SUMMARY

Various embodiments of the present disclosure are generally directed to a method and apparatus for enhancing performance of a storage device, such as a solid-state drive (SSD).

In some embodiments, an apparatus includes a main non-volatile memory (NVM), such as but not limited to a NAND flash memory. A host command queue lists pending data transfer commands to transfer data between the NVM and a host. A controller is configured to, for each write command received by the NVM, examine the host command queue and direct the NVM to read data adjacent a target location to which data are to be written by the write command and to transfer the read data to a read cache for subsequent transfer to the host.

These and other features and advantages which characterize the various embodiments of the present disclosure can be understood in view of the following detailed discussion and the accompanying drawings.

DETAILED DESCRIPTION

The present disclosure generally relates to the management of data transfer commands in a data storage device, such as but not limited to a solid-state drive (SSD).

Storage devices generally include a controller and a non-volatile memory (NVM). The controller communicates with a host (client) device to direct the storage of user data from the client device to the NVM, and to retrieve and transfer the user data from the NVM to the client device.

Solid-state drives (SSDs) are a popular form of storage device commonly used in current generation storage systems. SSDs use solid-state semiconductor memory, such as NAND flash, as the NVM. A flash memory is usually arranged as a number of flash semiconductor dies that are accessible via channels (lanes).

Data sets are distributed across the various dies to allow parallel processing of client access commands (e.g., read commands, write commands, etc.). Background operations are carried out to enable the SSD to service the client access commands at acceptable performance rates. Background commands can include garbage collection, map updates, calibration operations, etc. Client read commands are usually given priority over client write commands and background commands, at least to a degree.

One or more command queues are maintained to accumulate the commands pending execution. A scheduler function of the controller formats, schedules, and forwards the commands to the flash module in an appropriate order and at appropriate times as the resources necessary to execute the commands become available.

A collision generally refers to a situation where two or more pending commands require the same shared resource(s) in order to be completed. In addition to the dies and channels, other resources that can be involved with collisions include shared buffers used to generate/update map information or parity information, LDPC decoders, read and write data buffers used to store data during data transfers or GC (garbage collection), etc.

Collisions tend to degrade performance since commands are left in a pending state until the required resources become available. While some commands can be carried out in parallel if the required resource sets do not overlap (e.g., commands to different dies on different channels, commands that utilize different internal buffers, etc.), at present a sequential pipeline approach is often used so that, from a time sequence, a first command (C1) is serviced, after which a second command (C2) is serviced, and so on. In this arrangement, all of the required resources need to be available before each successive command is released for execution.

Various embodiments of the present disclosure address these and other limitations of the existing art by providing pre-suspend processing of write commands. While various embodiments are directed to the operation of a data storage device in the form of a solid-state drive (SSD), the various embodiments presented herein can be readily adapted for use in other forms of devices including, but not limited to, hard disc drives (HDDs), hybrid devices, optical recording devices, tape recording devices, etc.

As explained below, some embodiments provide a storage device with a controller and a non-volatile memory (NVM). A host command queue of the storage device lists pending data transfer commands from a host device to transfer data between the NVM and a host. A read cache is configured to temporarily store data requested by the host, or data that may be requested by the host in the near future. A write cache can be used to store pending write data to be transferred to the NVM. Other data structures can be used as well.

During operation, the NVM receives a sequence of write commands over time. Each write command instructs the NVM to write corresponding write data to an associated target location in the NVM. For each of at least a selected class of write commands received by the NVM, the controller examines the host command queue in response to the forwarding of the write command to the NVM. Based on a number of factors including other pending commands in the host command queue, the controller proceeds to direct the NVM to read data adjacent the associated target location to which the write data are to be written by the execution of the selected write command. These additional data read (fetched) from the NVM that are located adjacent the target location are returned to an appropriate location such as to the read cache. The fetched data can be forwarded to the host device, particularly in response to a pending read command in the host command queue.

In this way, each time that a selected write command is forwarded for execution by the NVM, proximate data adjacent the target location for the write data are read and returned to the read cache. The resources required to execute the read command are utilized to first retrieve data in the general area affected by the write command. In this way, the write command is delayed (pre-suspended) in order to retrieve data that may be of interest to the host device. This can reduce the occurrence of command collisions since the resources needed to execute the write command have already been selected and dedicated for the completion of the write command. It is therefore a low cost operation to quickly read the data proximate the location at which the write data associated with the write command are to be written. Examination of the pending read queue can be used to tailor the pre-suspend data that are read from the NVM. An observer mechanism can track the success of these pre-suspend reads and adaptively adjust the rate and range of fetched data to maintain the storage device in an optimal configuration for these pre-suspend reads.

The extent to which the fetched read data are adjacent the target location for the write data can vary depending on the requirements of a given application. In some cases, the adjacent data are physically proximate the same physical location, at least generally, to which the write data are to be written. This can include, without limitation, the same namespace, the same die or dies, the same channels, the same arrays, the same GCUs, the same erasure blocks, the same rows of memory cells, etc. In other cases, the adjacent data are logically proximate the target location to a sufficient extent that it is advantageous to fetch the read data coincident with the writing of the write data. In still other cases, the same or at least an overlapping set of resources needed to retrieve the read data will be used to write the write data, and it is on the basis of shared and/or overlapping resources that enables the controller to make the decision to proceed with the read data fetching operation.

Figure 1:
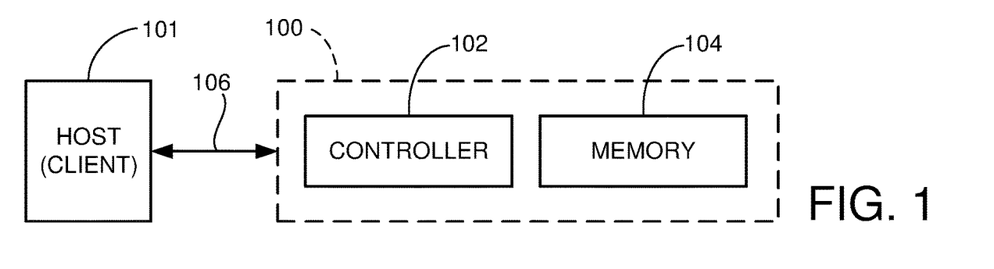
FIG. 1 provides a functional block representation of a data storage device constructed and operated in accordance with various embodiments of the present disclosure.

These and other features and advantages of various embodiments can be understood beginning with a review of FIG. 1 which provides a functional block representation of a data storage device 100. The storage device 100 is coupled to a host (client) device 101.

The storage device 100 includes a controller 102 and a memory 104. The controller 102 provides top-level control of the memory 104 and processes communications with the client 101. The memory 104 provides non-volatile memory (NVM) for the storage of user data from the client. The controller 102 is an electrical circuit that may take the form of a programmable CPU processor that operates in conjunction with programming stored in a computer memory within the device. The controller may alternatively be a hardware based circuit, or may incorporate both programmable and hardware circuit aspects. Commands and data are transferred between the client device 101 and the storage device 100 using a suitable host interface 106.

Figure 2:
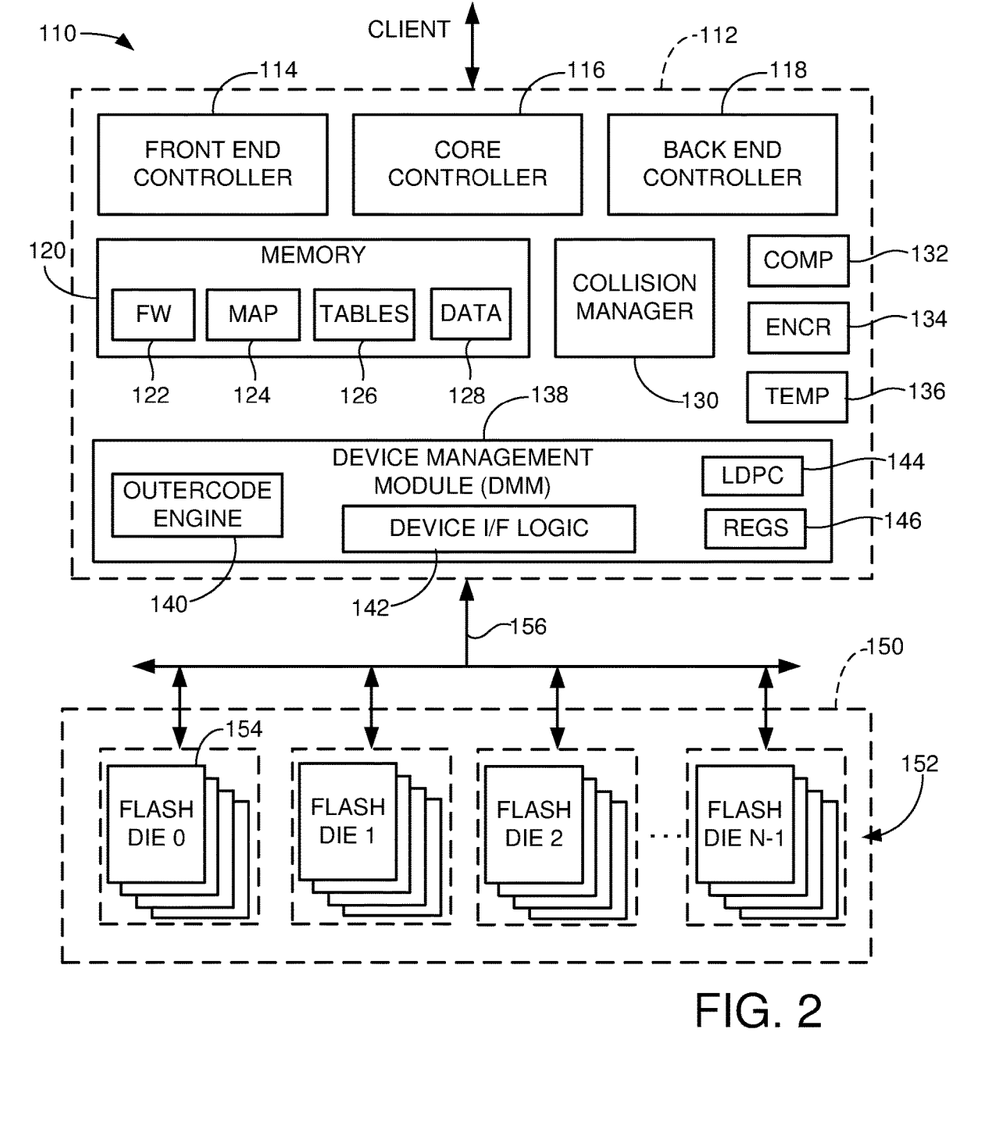
FIG. 2 illustrates the device of FIG. 1 characterized as a solid-state drive (SSD) in accordance with some embodiments.

FIG. 2 describes relevant aspects of an exemplary data storage device 110 corresponding to the device 100 of FIG. 1. The device 110 is a solid-state drive (SSD) that communicates with one or more client devices via one or more Peripheral Component Interface Express (PCIe) ports. The NVM comprises 3D NAND flash memory, although other forms of memory can be used.

In at least some embodiments, the SSD 110 operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner).

The SSD 110 includes a controller circuit 112 that corresponds to the controller 102 in FIG. 1. The controller circuit 112 has a front end controller 114, a core controller 116 and a back end controller 118. The front end controller 114 performs host I/F functions, the back end controller 118 directs data transfers with the memory module and the core controller 116 provides top level control for the device.

Each controller 114, 116 and 118 includes a separate programmable processor with associated programming (e.g., firmware, FW) in a suitable memory location, as well as various hardware elements to execute data management and transfer functions. Alternatively, some or all of the controllers 114, 116 and 118 may be realized using a single processor. A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers. The map data 124 may take the form of a flash transition layer (FTL) to identify physical locations at which logically addressed blocks of user data are stored.

A collision manager circuit 130 is incorporated into the controller 112 using hardware and/or firmware. As explained below, the collision manager 130 manages collisions among commands issued by the client 101 to service client commands and/or internal commands issued by the core controller 116 or other aspects of the SSD.

Continuing with FIG. 2, the controller 112 can include further features such as a data compression (COMP) block 132 which applies lossless data compression to input data sets during write operations to enhance storage efficiency. An encryption (ENCR) block 134 applies cryptographic processing such as encryption/decryption to provide data security for the SSD. A temperature (TEMP) block 136 uses one or more temperature sensors to monitor and record temperatures of the SSD during operation.

A device management module (DMM) 138 supports back end processing operations of the SSD. The DMM 138 includes an outer code engine circuit 140 to generate outer code, a device I/F logic circuit 142, and a low density parity check (LDPC) circuit 144 configured to generate and use LDPC codes as part of an error detection and correction strategy to protect the data stored by the SSD. A number of registers (REGS) 146 are provided to temporarily accumulate and store data during data transfer operations.

A memory module 150 is coupled to the controller 112 via the DMM 138. The memory module 150 corresponds to the memory 104 in FIG. 1, and includes a non-volatile memory (NVM) in the form of a flash memory 152 distributed across a plural number N of flash memory dies 154. Flash memory control electronics (not separately shown in FIG. 2) facilitate parallel data transfer operations via a plural number M channels (lanes) 156. In one embodiment, the flash memory 150 has 256 dies 154 (e.g., N=256) serviced by 8 channels 156 (e.g., M=8) so that 32 dies are coupled to each channel. Only one die can be accessed by each channel at a time, although up to eight dies can be accessed in parallel at a time using all eight channels. Other arrangements can be used.

While not limiting, modern SSDs and other data storage device systems are often formed from integrated memory modules such as 104, 150 that are commercially available from a source of such devices. The memory modules are integrated into an SSD by a device manufacturer which supplies the controller functions in a separate controller 102, 112. The controller may be a single integrated circuit such as in the case of a system on chip (SOC) design, or a grouping of integrated circuits.

In this arrangement, the controller and memory modules are separate operational entities which communicate across one or more internal command and data interfaces. A pull system is commonly used in which the controller issues commands to the memory, and then repetitively sends status inquiries to the memory to determine whether the commands have been completed.

Once the memory signals that a particular command has been completed, the controller may issue additional commands to the memory. For example, when the memory sends a command complete status for a read command, the controller may send a data transfer command to cause the memory to transfer the recovered data to the controller. While any number of different schemes can be employed to handle the interactions between the controller and the memory, it will be noted at this point that the various embodiments presented herein are particularly directed to improvements in the command and data exchanges between the controller and the memory.

Figure 3:
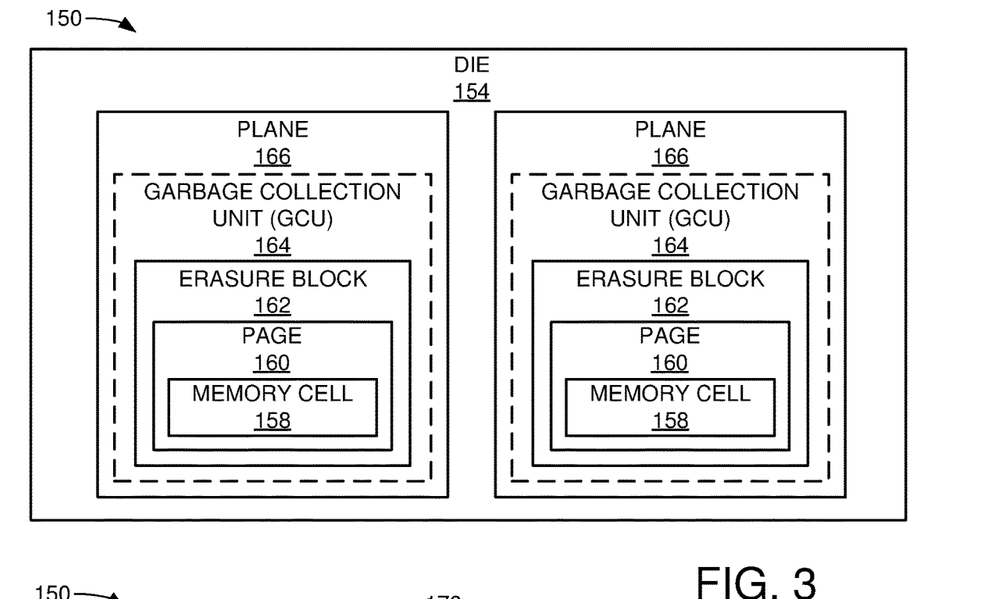
FIG. 3 shows a physical and logical layout of a flash die from FIG. 2 in some embodiments.

FIG. 3 shows a physical/logical arrangement of the various flash memory dies 154 in the flash memory module 150 of FIG. 2 in some embodiments. Each die 154 incorporates a large number of flash memory cells 158. The cells may be arrayed in a three-dimensional (3D stacked) arrangement with various control lines (e.g., source, bit, word lines) to access the cells.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), 4LCs (four-level cells with four bits per cell), and so on. Generally, n bits of data can be stored to a particular memory cell 158 using $2^n$ different charge states (e.g., TLCs use eight distinct charge levels to represent three bits of data, 4LCs use sixteen distinct charge levels to represent four bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle (garbage collect) the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies. The dies in a given GCU may be affixed to a single channel 156, or spread across multiple channels (see FIG. 2).

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
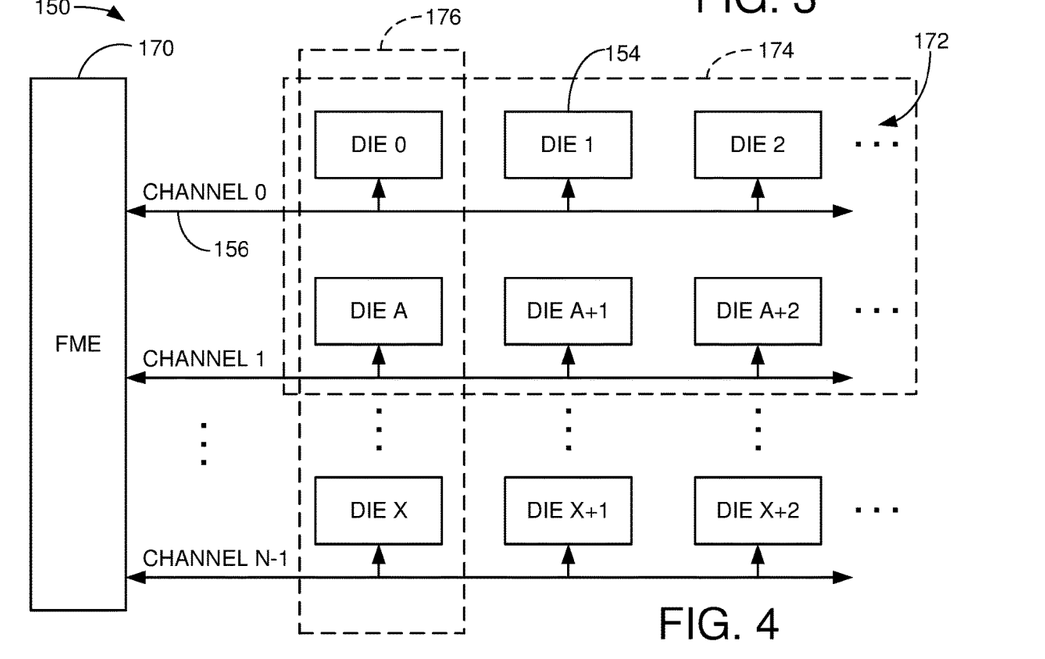
FIG. 4 illustrates an arrangement of the non-volatile memory (NVM) of FIG. 2 in some embodiments.

FIG. 4 shows an arrangement of the flash memory module 150 in further embodiments. A flash memory electronics (FME) module 170 serves as a front end for the various semiconductor memory dies 154. Groups of dies 154 are connected to individual channels 156 to form die sets 172. As noted above, one configuration provides a total of 256 dies interconnected using eight (8) channels so that each channel is connected to 32 dies. Other arrangements can be used. Only a single die can be accessed via the associated channel at a time. The dies 154 can be arranged into different groupings, such as a first grouping 174 which incorporates all of the dies affixed to the first two channels 156 (e.g., Channels 0 an 1). A second die grouping is represented at 176 which uses a separate die 154 across all of the channels 156.

It can be seen from the simplified illustration of FIG. 4 that different groupings of dies can be brought together to span the storage of data sets. Groupings that utilize just a portion of the available channels, such as the grouping 174, are advantageous in that data transfers to other groups can be carried out in parallel. On the other hand, groupings that utilize all of the available channels, such as the grouping 176, are advantageous in that such groupings can provide faster performance but at the requirement that all of the channels 156 need to be available before such transfers can be performed.

Figure 5:
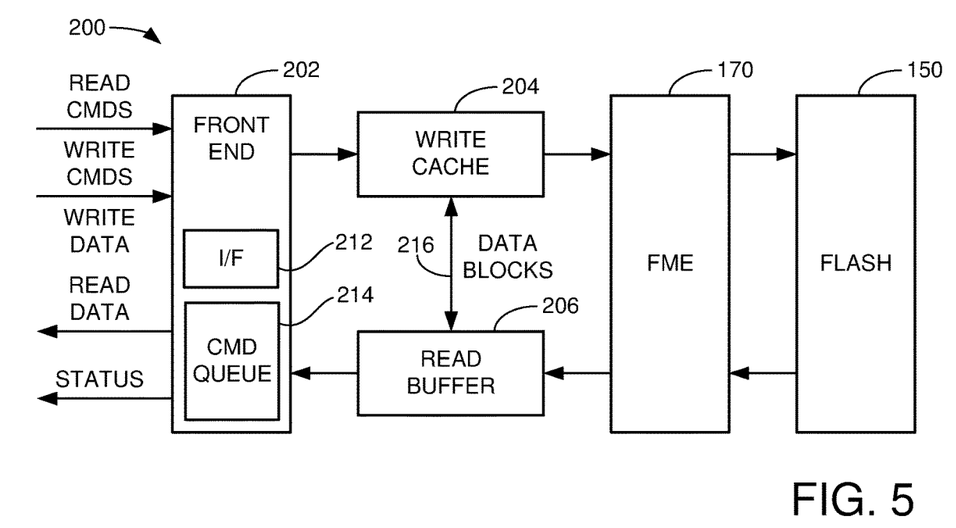
FIG. 5 depicts data paths through the SSD during the servicing of client access (read and write) commands in some embodiments.

FIG. 5 provides another functional representation of the SSD 110 of FIG. 2 in some embodiments. Circuitry 200 of the SSD 110 includes a front end 202, a write cache 204, and a read buffer 206. These elements interface with the flash memory electronics (FME) 170 and the flash memory module 150.

The front end 202 interfaces with one or more client devices 101 (FIG. 1) using an interface (I/F) circuit 212. Pending access commands, either from the client device or internally generated, are stored in one or more command queues 214.

During normal operation of the SSD 110, the client(s) will issue various access commands including read and write commands. Each client read command will constitute a request for some logical range (e.g., LBA range) of blocks to be retrieved from flash 150. Each client write command will constitute a request to store some logical range of blocks to the flash, and will be accompanied by a transfer of the associated writeback data from the client to the storage device.

The front end 202 processes these and other commands and arranges the respective read and write commands into one or more of the command queues 214 pending execution.

The writeback data are stored in the write cache 204 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME 170, which in turn directs the same to the flash 150. As noted above, the FME 170 is a rudimentary front end on each die or set of dies and serves to direct commands and data to the local read/write/erase circuitry of the respective planes. In the case of a write command, the writeback data are written to the next set of available pages 160 in an allocated GCU 164 (FIG. 3). In the case of a read command, the data are retrieved, subjected to error correction and other signal processing steps, and placed in the read buffer. The map metadata are accessed and updated as required during these operations.

Client read commands tend to receive priority over other commands, including client write commands and background commands, on the basis that the client is likely waiting for the requested readback data before it can proceed with subsequent processing steps. At the same time, the command scheduler function of the controller needs to execute the background operations (e.g., garbage collection, map updates, calibrations, etc.) at a sufficient rate to enable the storage device to continue to service the client access commands at acceptable performance levels. Another complicating factor is that the various competing pending commands and background operations may require the use of shared resources that have to be made available before the next command can be carried out. These resources can include data buffers, decoders, encryption/decryption circuitry, lanes, dies, registers, map data, memory locations, or other components and aspects of the system that are commonly employed to execute different types of commands. Shared resources can be viewed as resources that, when in use to support a first command, are not available to carry out a different second command until the use of those resources, via the execution of the first command, is completed.

Continuing with FIG. 5, the front end 202 provides various statuses to the client, including command complete statuses when commands are completed. For completed read commands, the command complete status may indicate that the requested readback data have been successfully retrieved and are now available for transfer from the read buffer 206. If writeback caching techniques are employed, the front end 202 may proceed to issue a write command complete status to the client, even if the writeback data are still pending in the write cache 204 and have not yet been written to the flash 150. To this end, the write cache 204 may take the form of NVM, such as NAND or NOR flash, although such is not necessarily required. The read cache 206 may normally be volatile memory, such as DRAM, since the readback data in the read cache can always be re-read from the non-volatile flash if required. In some cases, data blocks may be internally transferred between the write cache 204 and the read buffer 206, as indicated by internal data path 216.

Figure 6:
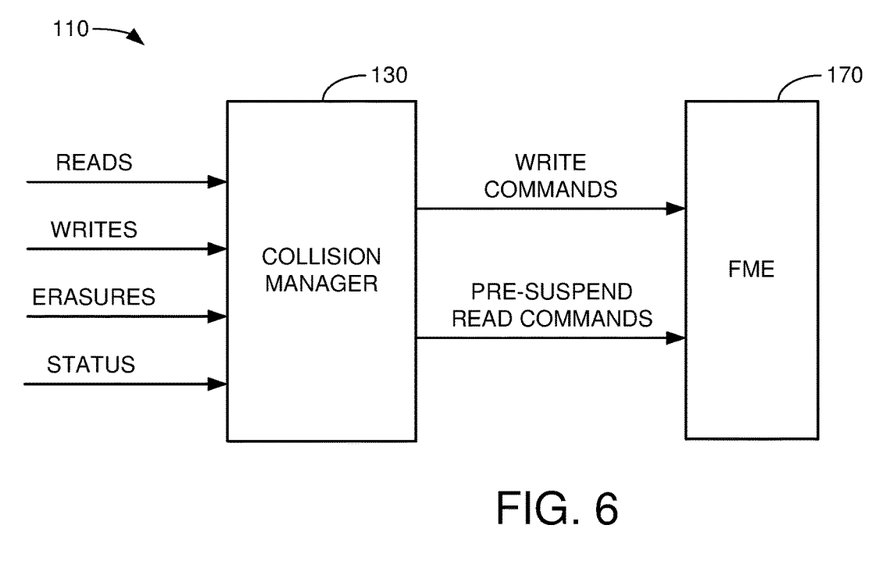
FIG. 6 depicts a collision manager circuit of the SSD in some embodiments.

FIG. 6 depicts the collision manager 130 of the SSD 110 from FIG. 2 in greater detail. The collision manager 130 receives and processes various commands from the command queues 214 of FIG. 5 including reads, writes, erasures and status requests. As noted above, these commands may be client commands or internal background commands.

The collision manager circuit 130 in turn issues various commands to the FME 170, including write commands and pre-suspend read commands. The pre-suspend read commands are issued in conjunction with, and are carried out with, the write commands. As explained more fully below, the pre-suspend read commands retrieve selected data in the same proximity as the write commands. Since certain resources have been dedicated for the execution of the write commands, the pre-suspend read commands may be carried out first to retrieve data that utilize the same resources dedicated for the associated write commands.

Figure 7:
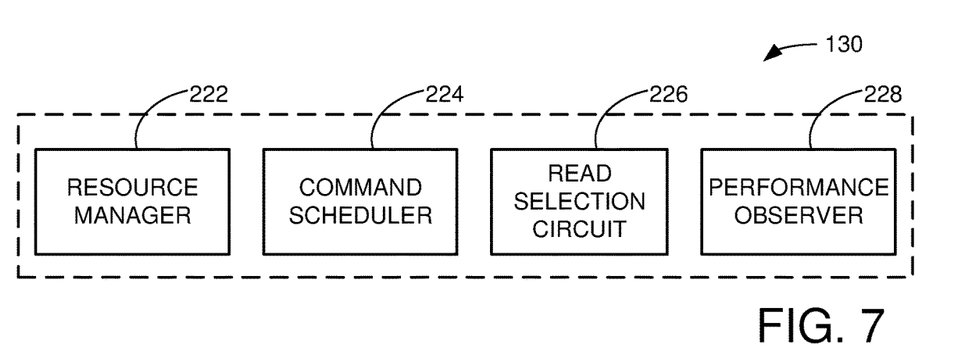
FIG. 7 illustrates aspects of the collision manager circuit of FIG. 6 in some embodiments.

The collision manager circuit 130 is shown in greater detail in FIG. 7. The arrangement is merely exemplary and is not limiting, as other configurations can be used.

A resource manager 222 is a circuit that tracks the necessary resources for the execution of each of the various commands in the respective command queues 214 (FIG. 5). It will be appreciated that some commands may be order-sensitive. For example, a read command may be required to retrieve certain FTL map data before a read or write command can be carried out to the associated location, so it would be necessary for the resource manager to identify the resources necessary to execute the map data retrieval command prior to the associated read or write command. In another example, a read command may be required to retrieve the current version data blocks from a given GCU prior to executing an erasure of the GCU, and so on.

A command scheduler 224 operates to select the various pending commands for execution in an appropriate order, based on the availability of the resources as indicated by the resource manager 222. The command scheduler 224 tracks other parameters as well; for example, the command scheduler will ensure that client read commands are executed to maintain a predetermined level of client I/O performance, will ensure that pending write data does not remain pending in the write queue beyond a predetermined limit, and so on.

In some cases, the command scheduler 224 will nominally maintain certain execution ratios deemed necessary to meet the requirements of the operational environment; for example, for every X reads, a write will be scheduled, and for every Y reads, a garbage collection operation may be scheduled, etc. The command scheduler 224 may further adjust the operation of the SSD 110 to meet further requirements, such as a period of deterministic operation required by a selected host per the NVMe specification during which a certain level of operation by the SSD is guaranteed for a limited period of time.

A read selection circuit 226 monitors the commands selected for execution by the command scheduler 226. When each write command is selected for execution, the read selection circuit 226 operates to examine the pending read commands in the respective read command queues 214 to identify reads that can be carried out using the same resources allocated to support the execution of the associated write command. For example, if a particular set of resources have been allocated for the execution of a pending write commands (e.g., channels, dies, registers, LDPC encoders, etc.), then the read selection circuit 226 will operate to identify a set of pending read commands that require this same set of resources. If one or more such read commands are pending, the read selection circuit 226 will insert one or more corresponding read commands for execution with the write command. The read commands may be carried out prior to the write command, although such is not necessarily required.

In further embodiments, the read selection circuit 226 may operate to identify a set of data that can be efficiently read from the flash memory module 150 using the allocated resources for the write command. This set of data may be speculative data not necessarily associated with a pending read command. In some cases, if some requested read data are within a selected logical range proximate the location to which the write data are to be written, a large set of data that includes the requested read data will be returned as part of the pre-suspend read operation, including non-requested data. The cost is low since the resources have already been allocated to support the write command.

In further cases, the pre-suspend read operation may be suspended in that only a subset of the available read recovery operations may be used to recover the data. As will be recognized, most read operations are relatively efficient in that, when a read operation occurs, the data can be retrieved using a single pass or a few passes through the read recovery operation. Recovered data are normally passed through a set of LDPC (or other decoder) circuits, and a recovery sequence is used to return the data. If unrecoverable bit errors are present in the retrieved data, the circuitry is set up to automatically engage in a number of read recovery operations (iterations) including free retries, adjustments to read thresholds, adjustments to ECC, etc. Since these are free reads associated with the write commands, the system can be commanded to recover that amount of data that can be retrieved without going beyond some predetermined level of recover operations. Different thresholds can be applied to the retrieved data based on whether the data being read are associated with a pending read command v. whether the data are speculative.

Continuing with FIG. 7, a performance observer circuit 228 is further included within the collision manager circuit 130 in some embodiments. The circuit 228 monitors the performance of the system to determine the success rate at which the pre-suspend read data are able to be used to satisfy pending, or future, read commands. If large amounts of pre-fetched speculative data are retrieved with each write operation and there are few if any cache hits, the amount of pre-fetched data may be decreased for future write commands. Contrawise, if large amounts of cache hits are obtained from the pre-fetched read data, the levels and amounts of pre-suspend read data may be increased. In this way, the system adaptively observes and adjusts the amount of readback data obtained with the execution of each write command.

Figure 8:
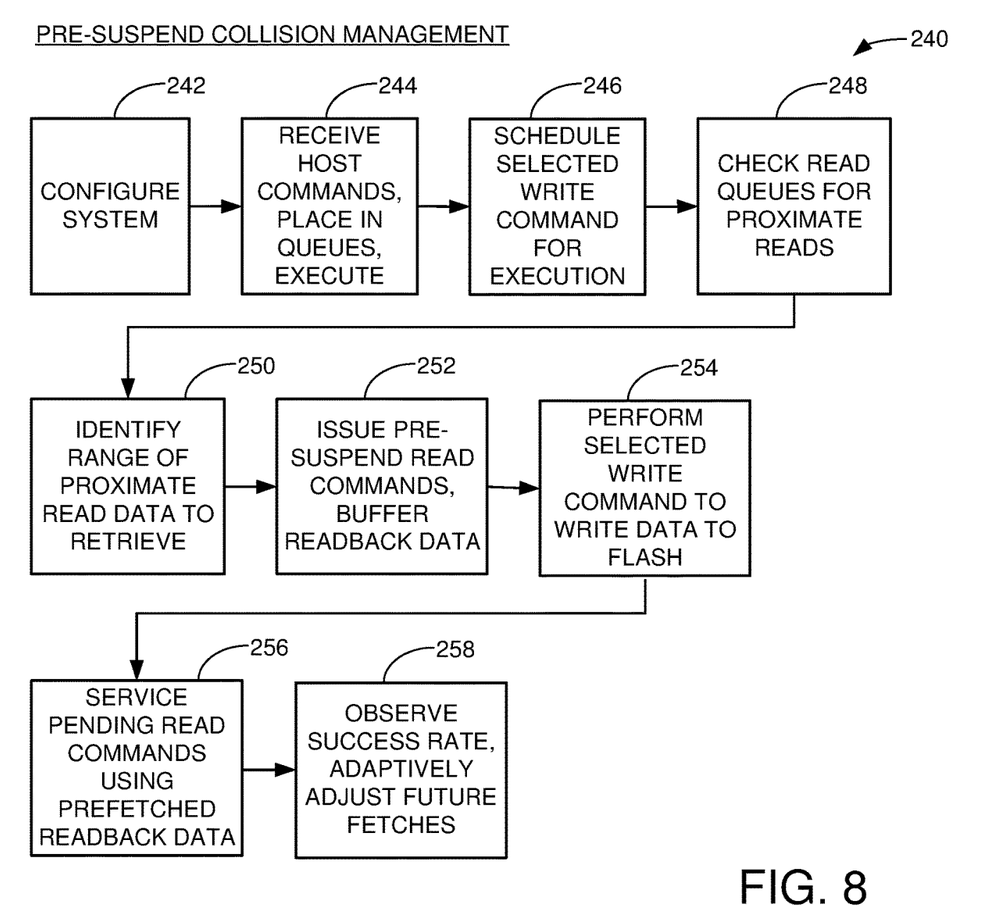
FIG. 8 is a sequence diagram to demonstrate pre-suspend collision management by the SSD in some embodiments.

FIG. 8 is a sequence diagram for a pre-suspend collision management routine 240 carried out by the SSD 110 in some embodiments. The sequence is merely exemplary and is not limiting, so that other steps can be carried out as required.

At block 242, the system is initially configured, which may include a system initialization operation upon power up. One activated and ready for normal operation, the system receives and processes various host commands, including host write and read commands, to transfer data between the host (client) and the NVM (flash), as shown by block 244. It will be appreciated that, after continued operation, internal background operations may additionally be generated and queued.

At block 246, a selected write command is identified for execution. At this point, the collision manager 130 operates to identify the presence of one or more pending read commands in the command queue(s) that have physical proximity to the location at which the write data are to be written, block 248.

If one or more read commands are present, the process proceeds at block 250 to identify a range of read data proximate the target write location to retrieve data. One or more pre-suspend read commands are issued at block 252 to request retrieval of this range of data to the readback buffer. Once the data are retrieved, the write command is performed at step 252.

Pending and future received read commands are thereafter serviced at block 254 using the pre-fetched data from the pre-suspend commands. At block 256, performance data are accumulated and used to adjust the amount of pre-fetched data for subsequently executed write commands.

It will now be appreciated that the various embodiments present a number of advantages over the existing art. By allocating resources to perform background write operations, certain I/O deficiencies will be imparted to the system operation. Taking advantage of the fact that these resources have been already allocated, there is great benefit to proceeding with the execution of one or more read operations, either to retrieve requested data or to pre-fetch speculative data based on previous history. In this way, future collisions can be reduced since the allocation of resources to perform write operations can be used to retrieve data that may have either already been requested, or may be requested in the near term.

While various embodiments have contemplated operation in the context of an SSD, this is merely for purposes of illustration and not limiting. Other forms of processing devices, including but not limited to hard disc drives (HDDs), hybrid drives, tape drives, etc. can also incorporate the various embodiments presented herein.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus, comprising:
a main non-volatile memory (NVM);
a host command queue that lists pending data transfer commands to transfer data between the NVM and a host; and
a controller circuit configured to sequentially schedule and forward the pending data transfer commands to the NVM for execution in an appropriate order based on an availability of resources necessary to execute the pending data transfer commands, wherein for a selected write command from among the pending data transfer commands that is next in the appropriate order for execution to store write data to an associated target location in the NVM, the controller circuit is further configured to allocate a set of resources to be used by the NVM to store the write data, examine the host command queue and, responsive to a presence of one or more pending read commands in the host command queue that require the allocated set of resources to read requested data from the NVM, issue a specially configured pre-suspend read command to delay the execution of the selected write command while advancing the one or more pending read commands out of the appropriate order to direct the NVM to read the requested data and to transfer the requested data to a read cache, followed by issuing the selected write command to store the write data to the associated target location, the identified set of resources comprising at least one shared data path element disposed between the NVM and the host command queue through which the write data pass as the write data are stored to the associated target location.

2. The apparatus of claim 1, wherein the requested data retrieved to the read cache by the specially configured pre-suspend read command includes pre-fetch speculative read data not covered by the one or more pending read commands in the host command queue that are physically or logically proximate the requested data covered by the one or more pending read commands.

3. The apparatus of claim 1, wherein the requested data retrieved to the read cache by the specially configured pre-suspend read command have a first range of logical addresses and the write data associated with the selected write command have an unrelated second range of logical addresses.

4. The apparatus of claim 1, wherein the controller circuit further directs a transfer of the read data from the read cache to the host.

5. The apparatus of claim 1, wherein the NVM comprises a flash memory comprising a plurality of semiconductor dies, and the at least one data path element comprises at least a selected one of an internal data buffer that temporarily stores the write data or a channel interconnection path coupled to the semiconductor dies along which the write data pass.

6. The apparatus of claim 1, wherein the controller comprises a resource manager that identifies the selected set of resources necessary to execute the selected write command, the selected set of resources comprising an error circuit configured to generate and use error codes as part of an error detection and correction strategy to protect the write data stored by the NVM.

7. The apparatus of claim 1, wherein a plurality of read commands are issued by the controller to a flash memory electronics (FME) module associated with a flash memory of the NVM for execution prior to the execution of the write command.

8. The apparatus of claim 1, wherein the retrieved read data are observed for satisfaction of subsequent cache hits and the controller adjusts an amount of read data retrieved from the NVM in conjunction with future write commands based on the rate at which the retrieved read data are used to satisfy said subsequent cache hits.

9. The apparatus of claim 1, wherein data are written to the NVM in garbage collection units (GCUs) and the read data obtained prior to the execution of the selected write command are in a selected GCU to which the write data are to be written.

10. The apparatus of claim 1, characterized as a solid-state drive (SSD) with the NVM comprising a solid state semiconductor flash memory formed from a plurality of flash dies, wherein the associated target location comprises a subset of the plurality of flash dies from which the read data are retrieved and to which the write data are written.

11. A solid-state drive (SSD), comprising:
a flash memory comprising a plurality of semiconductor dies;
a host command queue configured to accumulate pending data transfer commands to transfer data between the flash memory and a host device, the data transfer commands comprising write commands and read commands; and
a controller circuit configured to schedule and forward the pending data transfer commands to the flash memory for execution in an appropriate order based on an availability of resources necessary to execute the pending data transfer commands, wherein for a selected host write command from among the pending data transfer commands that is next in the appropriate order for execution, the controller circuit is further configured to allocate a set of resources of the flash memory necessary to carry out the selected host write command, examine the host command queue and identify a presence of one or more pending host read commands in the host command queue that require at least a portion of the allocated set of resources to read requested data from the flash memory, issue a specially configured pre-suspend read command to delay the execution of the selected host write command while advancing the one or more pending host read commands out of the appropriate order to direct the flash memory to read the requested data adjacent a target location in the flash memory to which the write data are to be written by the selected host write command and to transfer the requested data from the flash memory to a read cache for subsequent transfer to the host device, followed by issuing the selected host write command to store the write data to the target location in the flash memory, the allocated set of resources comprising at least one data path element operationally disposed between the host command queue and the semiconductor dies through which the requested data and the write data respectively pass while remaining unavailable for use in servicing other pending data transfer commands.

12. The SSD of claim 11, wherein the controller circuit further selects a range of the requested data to be retrieved from the flash memory based on a logical address associated with the one or more pending host read commands in the host command queue.

13. The SSD of claim 11, wherein the controller circuit further identifies a range of data to be retrieved from the flash memory in conjunction with the execution of the selected host write command based on one or more background read operations generated by the controller circuit.

14. The SSD of claim 11, wherein the controller circuit comprises a resource manager that identifies the allocated set of resources necessary to execute the selected host write command, the selected set of resources comprising at least a selected one of encryption/decryption circuitry, a first channel interconnection path coupled to a first set of the semiconductor dies, or a register of the flash memory coupled to the first channel interconnection path as well as a second channel interconnection path coupled to a different, second set of the semiconductor dies.

15. The SSD of claim 11, wherein a plurality of read commands are issued by the controller circuit to a flash memory electronics (FME) module associated with the flash memory for execution prior to the execution of the selected host write command.

16. A method, comprising:
accumulating, in a host command queue, pending data transfer commands to transfer data between a non-volatile memory (NVM) and a host device, the data transfer commands comprising write commands and read commands;
temporarily storing write data associated with the write commands in a write cache;
determining an initial appropriate order for execution of the pending data transfer commands based on an availability of resources necessary to execute the pending data transfer commands;
forwarding a selected write command from the host command queue to the NVM that is next in the initial appropriate order, the selected write command associated with selected write data in the write buffer;

identifying a set of resources allocated to facilitate execution of the selected write command to write the selected write data to the NVM, the first set of resources comprising a shared data path element disposed between the write buffer and the NVM;

examining the host command queue responsive to the forwarding of the selected write command to the NVM;

identifying a pending read command in the host command queue that requires the set of resources in order to read requested data from the NVM; and forwarding a pre-suspend read command to the NVM that delays the execution of the selected write command and advances the pending read command out of the initial appropriate order, the pre-suspend read command directing the NVM to retrieve the requested data from adjacent a target location to which the selected write data are to be written prior to executing the selected write command so that the forwarded selected write command is temporarily suspended until completion of the pre-suspend read command and so that both the pre-suspend read command and the selected write command both utilize the identified set of resources.

17. The method of claim 16, wherein the shared data path element comprises error coding and decoding circuitry used to encode the selected write data during execution of the selected write command and to decode the requested data during execution of the pre-suspend read command.

18. The method of claim 16, wherein data are written to the NVM in garbage collection units (GCUs), and wherein the target location comprises a selected GCU to which the write data are to be written and from which the read data are retrieved.

19. The method of claim 16, wherein the identified set of resources comprises a data buffer sequentially used to temporarily store the requested data and the selected write data.

20. The method of claim 16, wherein the target location comprises a subset of flash dies in a flash memory to which the write data are written and from which the read data are retrieved, and wherein the shared data path element comprises a channel interconnection path that interconnects the subset of flash dies.

* * * * *